US010544615B2

(12) United States Patent
Takizawa et al.

(10) Patent No.: US 10,544,615 B2
(45) Date of Patent: Jan. 28, 2020

(54) ACTUATOR FOR OPENING AND CLOSING A VEHICLE DOOR

(71) Applicant: Mitsuba Corporation, Gunma (JP)

(72) Inventors: Takashi Takizawa, Kiryu (JP); Takayuki Ikeda, Kiryu (JP); Yoshitaka Sekine, Kiryu (JP); Masazumi Ishikawa, Kiryu (JP)

(73) Assignee: Mitsuba Corporation, Gunma (JP)

(*) Notice: Subject to any disclaimer, the term of this patent is extended or adjusted under 35 U.S.C. 154(b) by 14 days.

(21) Appl. No.: 15/746,020

(22) PCT Filed: Jul. 21, 2016

(86) PCT No.: PCT/JP2016/071402
§ 371 (c)(1),
(2) Date: Jan. 19, 2018

(87) PCT Pub. No.: WO2017/022503
PCT Pub. Date: Feb. 9, 2017

(65) Prior Publication Data
US 2018/0216390 A1 Aug. 2, 2018

(30) Foreign Application Priority Data
Jul. 31, 2015 (JP) ................... 2015-151721

(51) Int. Cl.
E05F 15/622 (2015.01)
F16H 25/20 (2006.01)
(Continued)

(52) U.S. Cl.
CPC .......... E05F 15/622 (2015.01); E05F 15/689 (2015.01); F16H 1/46 (2013.01);
(Continued)

(58) Field of Classification Search
CPC .. E05F 15/622; B60J 5/10; F16H 1/32; F16H 2025/2043; F16H 2025/2087; F16H 2025/2031
See application file for complete search history.

(56) References Cited

U.S. PATENT DOCUMENTS 7,938,473 B2 * 5/2011 Paton .................... B60J 5/101
296/146.8
9,605,464 B2 * 3/2017 Kessler .................... H02K 1/17
(Continued)

FOREIGN PATENT DOCUMENTS

CN 102124636 A 7/2011
CN 203374119 U 1/2014
(Continued)

OTHER PUBLICATIONS

PCT Office, International Search Report issued in PCT/JP2016/071402 dated Sep. 13, 2016, 3 pages.
(Continued)

Primary Examiner — Gregory J Strimbu
(74) Attorney, Agent, or Firm — Wood Herron & Evans LLP

(57) ABSTRACT

An actuator includes a yoke having an inner circumferential surface; an armature including a rotary shaft provided inside the yoke; a drive shaft configured to be driven to rotate when receiving a rotating force from the rotary shaft; a cylindrical first housing; a second housing relatively movable with respect to the first housing; a speed reduction gear part is disposed between the rotary shaft and the drive shaft; and a driven member is connected to the drive shaft for moving in an axial direction of the drive shaft in response to rotation of the drive shaft. The yoke is disposed within the first housing and a damper member is disposed between the first housing and the speed reduction gear part.

8 Claims, 9 Drawing Sheets

(51) Int. Cl.
*E05F 15/689* (2015.01)
*F16H 1/46* (2006.01)
*B60J 5/10* (2006.01)

(52) U.S. Cl.
CPC ............... *F16H 25/20* (2013.01); *B60J 5/102* (2013.01); *E05Y 2201/434* (2013.01); *E05Y 2201/686* (2013.01); *E05Y 2201/70* (2013.01); *E05Y 2201/72* (2013.01); *E05Y 2201/726* (2013.01); *E05Y 2600/45* (2013.01); *E05Y 2600/46* (2013.01); *E05Y 2900/546* (2013.01); *F16H 2025/2031* (2013.01); *F16H 2025/2043* (2013.01); *F16H 2025/2075* (2013.01); *F16H 2025/2087* (2013.01)

(56) References Cited

U.S. PATENT DOCUMENTS

| | | | | |
|---|---|---|---|---|
| 9,776,483 | B2* | 10/2017 | Shchokin | B60J 5/107 |
| 10,141,813 | B2* | 11/2018 | Cheong | H02K 1/22 |
| 2006/0082188 | A1 | 4/2006 | Mitchell | |
| 2009/0000201 | A1* | 1/2009 | Fahl | E05F 15/622 |
| | | | | 49/280 |
| 2012/0013143 | A1* | 1/2012 | Schiegel | E05F 15/40 |
| | | | | 296/146.4 |
| 2015/0040698 | A1 | 2/2015 | Kessler et al. | |
| 2015/0376929 | A1* | 12/2015 | Scheuring | E05F 15/622 |
| | | | | 74/89.38 |
| 2017/0114580 | A1* | 4/2017 | Dietzel | F16F 9/54 |
| 2017/0175859 | A1* | 6/2017 | Brockmeier | A61M 5/31511 |
| 2017/0268276 | A1* | 9/2017 | Fischer | F16H 25/20 |

FOREIGN PATENT DOCUMENTS

| | | |
|---|---|---|
| DE | 3705528 A1 | 9/1988 |
| DE | 102012014135 A1 | 1/2014 |
| JP | 58053857 U | 4/1983 |
| JP | 2014100956 A | 6/2014 |
| WO | 2015061885 A1 | 5/2015 |

OTHER PUBLICATIONS

Chinese Patent Office, Office Action issued in Chinese Patent Application No. 201680044005.1 dated Dec. 11, 2018, 7 pages.
European Patent Office, Search Report issued in EP 16832782.3 dated Feb. 21, 2019, 7 pages.

* cited by examiner

ACTUATOR FOR OPENING AND CLOSING A VEHICLE DOOR

TECHNICAL FIELD

The present invention relates to an actuator used to open/close a door such as, for instance, a tailgate or the like of a vehicle, and an actuator for opening/closing a vehicle door.

Priority is claimed on Japanese Patent Application No. 2015-151721, filed on Jul. 31, 2015, the content of which is incorporated herein by reference.

BACKGROUND

Conventionally, door opening/closing devices for a vehicle, which include an actuator (a support member) that is telescopically driven in an axial direction between a periphery of an opening of a vehicle body side and a tailgate (a back door) provided at this opening to be openable/closable, and thereby opens/closes the tailgate, are known (e.g., see Japanese Unexamined Patent Application, First Publication No. 2014-100956).

This actuator includes a tubular first housing, a second housing which has a larger diameter than the first housing and in which the first housing is inserted, a motor that is provided inside the first housing, a screw spindle that is coupled to the motor via a speed reducer and is disposed coaxially with the motor, a spindle nut that is fixed to the second housing and is screwed on the screw spindle, and a compression coil spring that is housed in the second housing and biases the first housing and the second housing in a direction of extension. The motor and the speed reducer are separately provided inside the first housing. A bearing for rotatably supporting a rotary shaft of the motor is provided by applying a drawing process on a motor housing. On the other hand, the speed reducer is rotatably supported by the rotary shaft of the motor and the screw spindle.

With this constitution, when the actuator drives and rotates the motor, rotation of an output shaft of the motor is transmitted to the screw spindle via the speed reducer, and the screw spindle is rotated. Due to the rotation of the screw spindle, the spindle nut screwed on the screw spindle moves in an axial direction of the screw spindle. Thereby, the second housing is projected/retracted with respect to the first housing, and the actuator is expanded/contracted.

SUMMARY OF INVENTION

Problems to be Solved by the Invention

Since the motor and the speed reducer of the actuator as described above are separate components, it is difficult to coaxially arrange the center of the rotary shaft of the motor, the center of the speed reducer, and the center of the screw spindle in the first housing with high accuracy. To align the rotary shaft of the motor and the speed reducer with high accuracy, there is a problem that it takes effort to assemble the actuator and that production costs are also high. When the motor and the speed reducer are misaligned, a problem that excessive stress is applied to the components such that durability is reduced, a problem that collision between the components becomes strong such that operating noise is increased, or the like occurs.

The present invention provides an actuator and an actuator for opening/closing a vehicle door, capable of improving assemblability and workability of each component to reduce production costs.

Means for Solving the Problem

According to a first aspect of the present invention, an actuator includes: a tubular yoke; an armature provided on an inner side of the yoke in a radial direction and provided to be rotatable with respect to the yoke; a drive shaft configured to receive a rotating force of a rotary shaft of the armature and driven to rotate; a speed reduction gear part provided between the rotary shaft and the drive shaft and configured to reduce a rotation speed of the rotary shaft; and a driven member connected to the drive shaft and configured to move in an axial direction of the drive shaft in association with the rotation of the drive shaft. A gear case of the speed reduction gear part is provided on an inner circumferential surface of the yoke, and a bearing for rotatably supporting the rotary shaft is provided in the gear case.

In this way, the gear case of the speed reduction gear part is provided on the inner circumferential surface of the yoke of the motor. Thereby, a relative position between the yoke and the gear case can be determined with ease and with high accuracy. Furthermore, since the bearing for rotatably supporting the rotary shaft is provided in the gear case, the central axis (the rotational axis) of the motor and the central axis of the speed reduction gear part can be aligned with ease and with high accuracy.

The bearing is provided in the gear case, and thereby there is no need to apply a drawing process or the like for supporting the bearing on the yoke. Thus, the processing costs of the yoke can be reduced.

Therefore, the assemblability of the actuator can be improved, and the workability of each component can be improved to reduce a production cost.

According to a second aspect of the present invention, in the actuator according to the first aspect of the present invention, the speed reduction gear part includes: a sun gear provided on the rotary shaft; a ring gear provided at an outer circumferential portion of the sun gear; a planetary gear meshed with the sun gear and the ring gear and configured to carry out planetary motion between the sun gear and the ring gear in accordance with a rotation of the sun gear; and a rotary member configured to be rotated by a revolution of the planetary gear about the sun gear, and the gear case is the ring gear.

With this constitution, when the speed reduction gear part is a planetary speed reduction mechanism, the ring gear disposed on the outer circumferential portion thereof is provided on the inner circumferential surface of the yoke as the gear case, and thereby the motor and the planetary speed reduction mechanism can be aligned with ease and with high accuracy.

A space can be saved while increasing a speed reduction ratio of the speed reduction gear part.

According to a third aspect of the present invention, in the actuator according to the second aspect of the present invention, the ring gear is provided at the yoke such that a relative rotation of the ring gear is impossible.

With this constitution, during rotation of the rotary shaft, due to a reaction force of the rotary shaft, the speed reduction gear part can be prevented from rotating relative to the drive shaft. For this reason, coaxial accuracy of the ring gear and the rotary shaft can be improved, and drive efficiency of the actuator can be increased.

According to a fourth aspect of the present invention, in the actuator according to the second aspect or the third aspect of the present invention, the sun gear, the planetary gear, and the rotary member are provided in multiple stages in an axial direction of the rotary shaft, and the ring gear has a tubular shape and has gear teeth of the same pitch which are meshed with those of the planetary gear of multiple stages on an inner circumferential surface.

With this constitution, when the planetary speed reduction mechanism has a constitution of such multiple stages, the gear teeth formed on the inner circumferential surface of the ring gear are formed with the same pitch to be meshed with those of all the planetary gears of the multiple stages, and thereby the ring gear can be easily manufactured.

According to a fifth aspect of the present invention, in the actuator according to any one of the first to fourth aspects of the present invention, a locking part locking the yoke and the gear case is formed.

With this constitution, the gear case can be reliably positioned and fixed with respect to the yoke, and when the rotary shaft or the drive shaft is rotated, the speed reduction gear part can be prevented from being relatively rotated by a reaction force of the rotary shaft or the drive shaft.

According to a sixth aspect of the present invention, an actuator for opening/closing a vehicle door is an actuator that is used to drive the actuator according to any one of the first to fifth aspects of the present invention in order to open/close the door provided to be openable/closable with respect to an opening. The yoke is coupled to any one of the opening and the door via a first housing, and the driven member is coupled to the other of the opening and the door via a second housing.

With this constitution, in the actuator for opening/closing a vehicle door which opens/closes the door provided in the opening, assemblability and workability of each component are improved, and production costs can be reduced.

Advantage of the Invention

According to the actuator and the actuator for opening/closing a vehicle door described above, the gear case of the speed reduction gear part is provided on the inner circumferential surface of the yoke of the motor. Thereby, a relative position between the yoke and the gear case can be determined with ease and with high accuracy. Furthermore, since the bearing for rotatably supporting the rotary shaft is provided in the gear case, the central axis (the rotational axis) of the motor and the central axis of the speed reduction gear part can be aligned with ease and with high accuracy.

The bearing is provided in the gear case, and thereby there is no need to apply a drawing process or the like for supporting the bearing on the yoke. Thus, the processing costs of the yoke can be reduced.

Therefore, the assemblability of the actuator can be improved, and the workability of each component can be improved to reduce production costs.

DESCRIPTION OF THE EMBODIMENTS

Next, an embodiment of the present invention will be described on the basis of the drawings.
(Actuator for Opening/Closing Vehicle Door)

Figure 1:
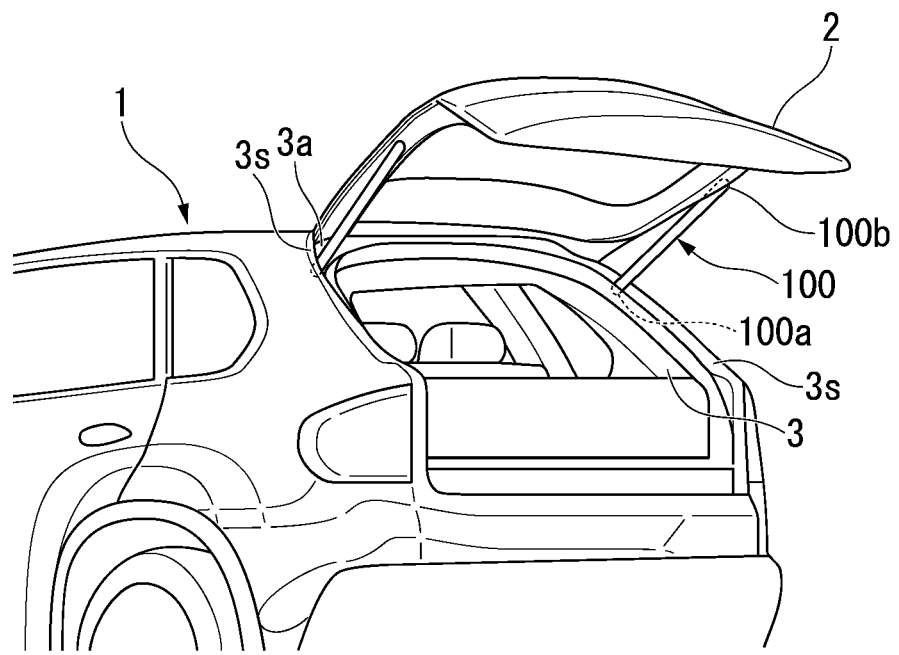
FIG. 1 is a perspective view illustrating an example of a vehicle having an actuator for opening/closing a vehicle door in an embodiment of the present invention.

FIG. 1 is a perspective view illustrating an example of a vehicle having an actuator 100 for opening/closing a vehicle door (hereinafter referred to simply as an actuator 100) in an embodiment of the present invention.

As illustrated in the same figure, the actuator 100 opens/closes, for instance, a tailgate (a door) 2 of a vehicle 1. The tailgate 2 is provided to be openable/closable relative to an opening 3, which is formed in the rear of a vehicle body of the vehicle 1, via a hinge mechanism (not shown) at an upper portion 3a of the opening 3.

The actuator 100 is provided on both left and right sides of the opening 3, one end 100a thereof is pivotably coupled to a lateral frame part 3s of the opening 3 via a pin (not shown), and the other end 100b thereof is pivotably coupled to the tailgate 2 via a pin (not shown).

Figure 2:
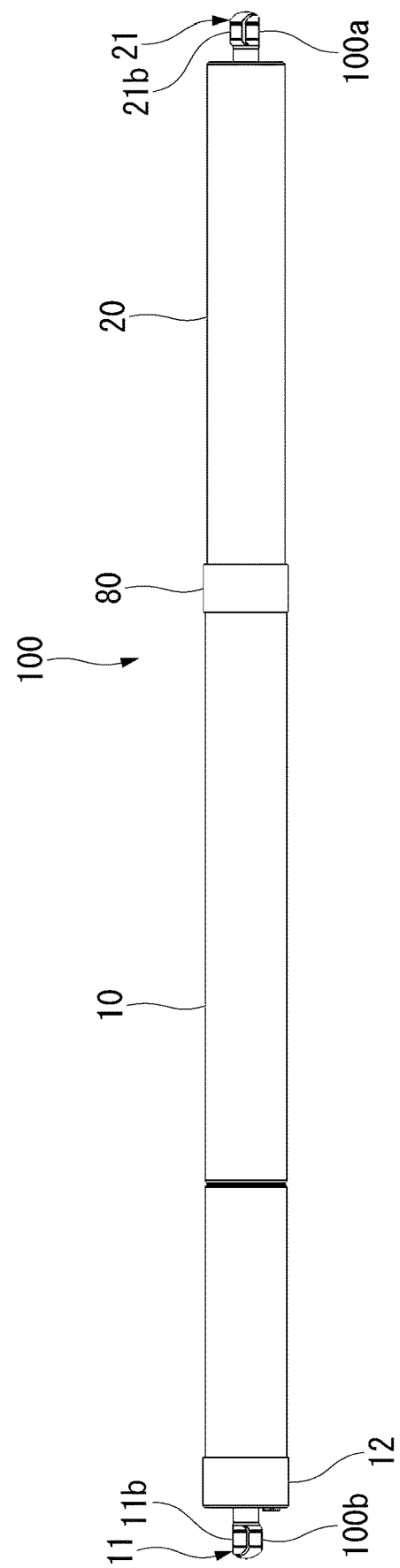
FIG. 2 is a side view illustrating an exterior of the actuator for opening/closing a vehicle door in the embodiment of the present invention.
Figure 3:
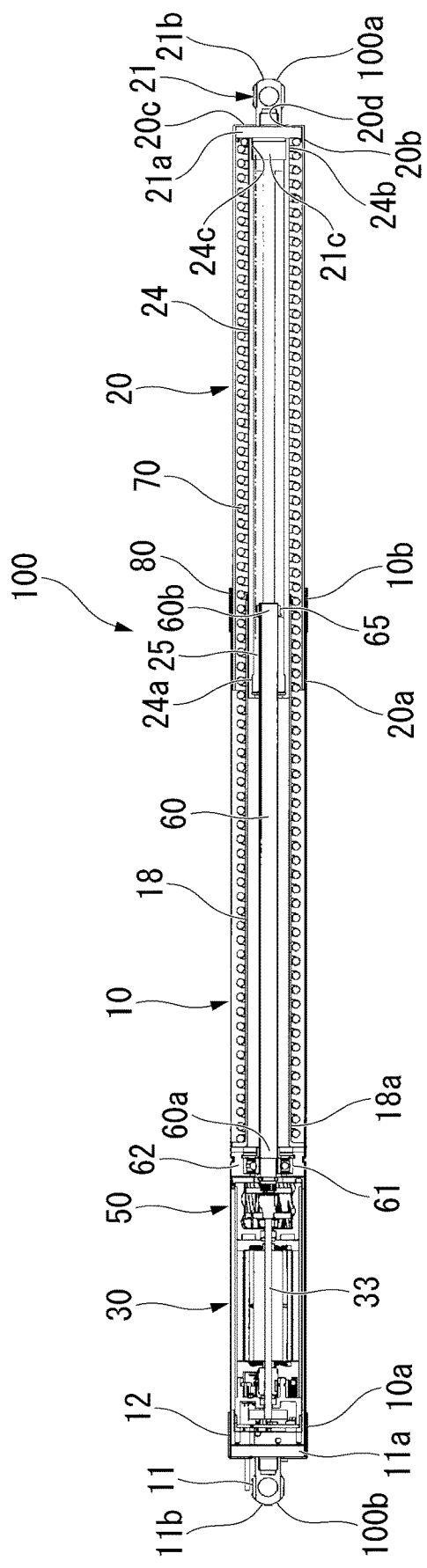
FIG. 3 is a sectional view of the actuator for opening/closing a vehicle door in the embodiment of the present invention.
Figure 4:
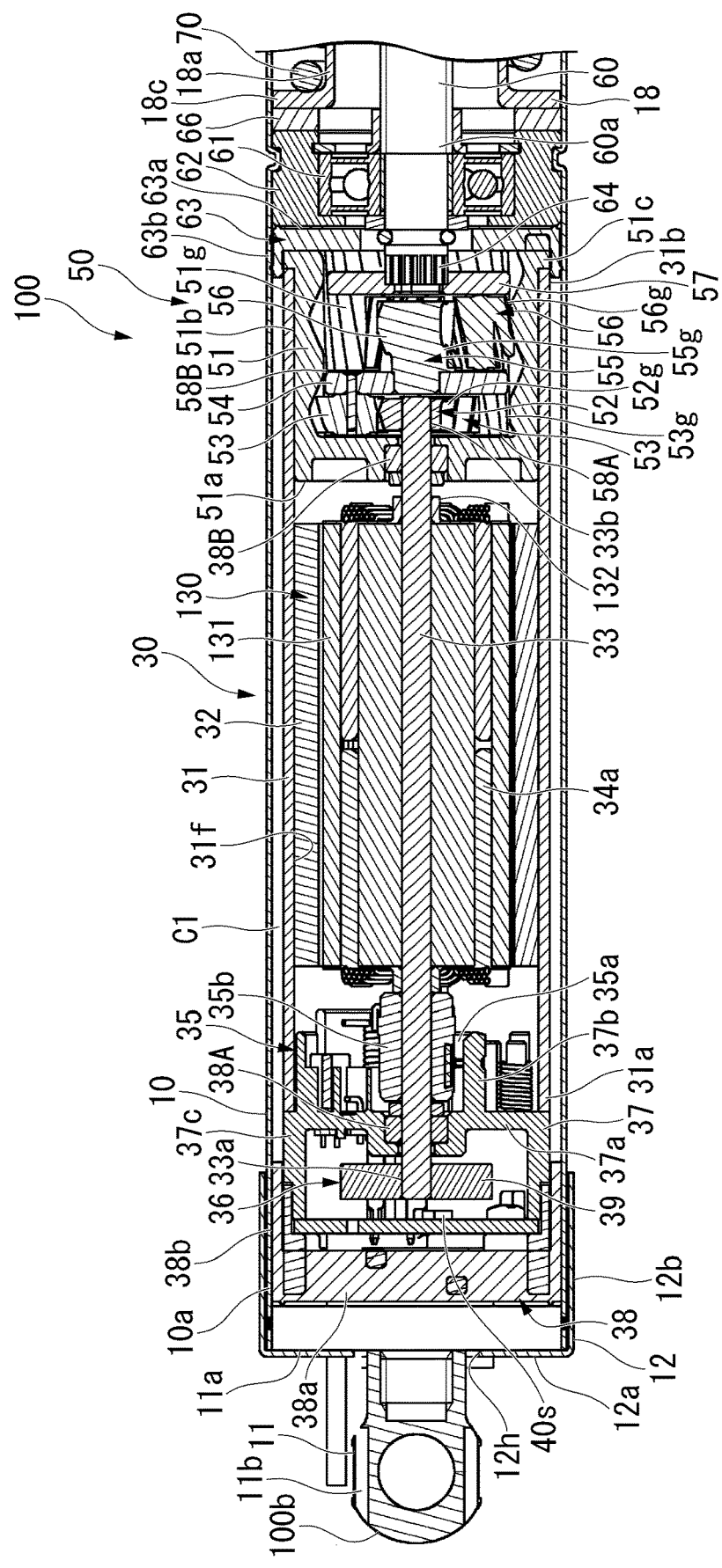
FIG. 4 is an enlarged sectional view illustrating a motor part and a speed reduction gear part in the embodiment of the present invention.

FIG. 2 is a side view illustrating an exterior of the actuator 100. FIG. 3 is a sectional view of the actuator 100. FIG. 4 is an enlarged sectional view illustrating a motor part 30 and a speed reduction gear part 50 of the actuator 100.

As illustrated in FIGS. 2 and 3, the actuator 100 includes a first housing 10, a second housing 20, a motor part 30, a speed reduction gear part 50 that reduces and outputs a rotational force of the motor part 30, a screw shaft 60 that is rotated by the rotational force of the motor part 30 which is transmitted via the speed reduction gear part 50, and a coil spring 70.

The first housing 10 has a cylindrical shape and is formed of a metal material such as iron.

As illustrated in FIG. 4, a joint member 11 coupled to the tailgate 2 side via a pin (not shown) is provided at one end 10a (a left end in FIG. 4) of the first housing 10. The joint member 11 includes a plate part 11a that has a disc shape and is fitted inside the one end 10a of the first housing 10, and a joint part 11b which protrudes from the plate part 11a to the outside of the first housing 10 and to which a pin (not shown) is coupled.

A cap 12 is mounted on the one end 10a of the first housing 10. The cap 12 integrally includes a discoid blockage part 12a that has an insertion hole 12h, into which the joint part 11b of the joint member 11 is inserted, in the center thereof, and a tubular part 12b that continuously extends from an outer circumferential portion of the blockage part 12a. The one end 10a of the first housing 10 is press-fitted into the tubular part 12b, and thereby the cap 12 is fixed to the first housing 10.

As illustrated in FIG. 3, the second housing 20 has a cylindrical shape that has an outer diameter smaller than an inner diameter of the first housing 10, and is formed of a material, such as a resin, which is softer than the material of the first housing 10. In this way, the second housing 20 reduces a weight relative to the first housing 10.

One end 20a (a left end side in FIG. 3) of the second housing 20 is inserted into the first housing 10 from the other end 10b side (a right end side in FIG. 3) of the first housing 10. The second housing 20 is configured to be movable relative to the first housing 10 in a direction in which it is projected/retracted from the other end 10b.

The other end 20b of the second housing 20 has a bottom 20c formed by a deep drawing process or the like. A through-hole 20d into which a joint part 21b of a joint member 21 (to be described below) can be inserted is formed in the center of this bottom 20c in a radial direction of the bottom 20c.

The joint member 21 is provided inside the bottom 20c of the other end 20b of the second housing 20. The joint member 21 is for coupling the lateral frame part 3s of the opening 3 of the vehicle 1 to the second housing 20. The joint member 21 has a plate part 21a that is fitted inside the other end 20b of the second housing 20, and the joint part 21b that protrudes outward from the plate part 21a via the through-hole 20d formed in the bottom 20c. The lateral frame part 3s of the opening 3 is coupled to this joint part 21b via a pin (not shown).

The plate part 21a is disposed to face the bottom 20c and is fixed to the other end 20b of the second housing 20 by swaging or the like. An externally threaded part 21c protruding to the inside of the second housing 20 is provided in the center of the plate part 21a in a radial direction of the plate part 21a. The other end 24b of a cylindrical inner tube 24 is screwed onto this externally threaded part 21c.

The cylindrical inner tube 24 is disposed in the second housing 20. The inner tube 24 is formed of, for instance, aluminum by a drawing process. An internally threaded part 24c screwed on the externally threaded part 21c of the joint member 21 is cut in the other end 24b of the inner tube 24.

(Motor Part)

Figure 5:
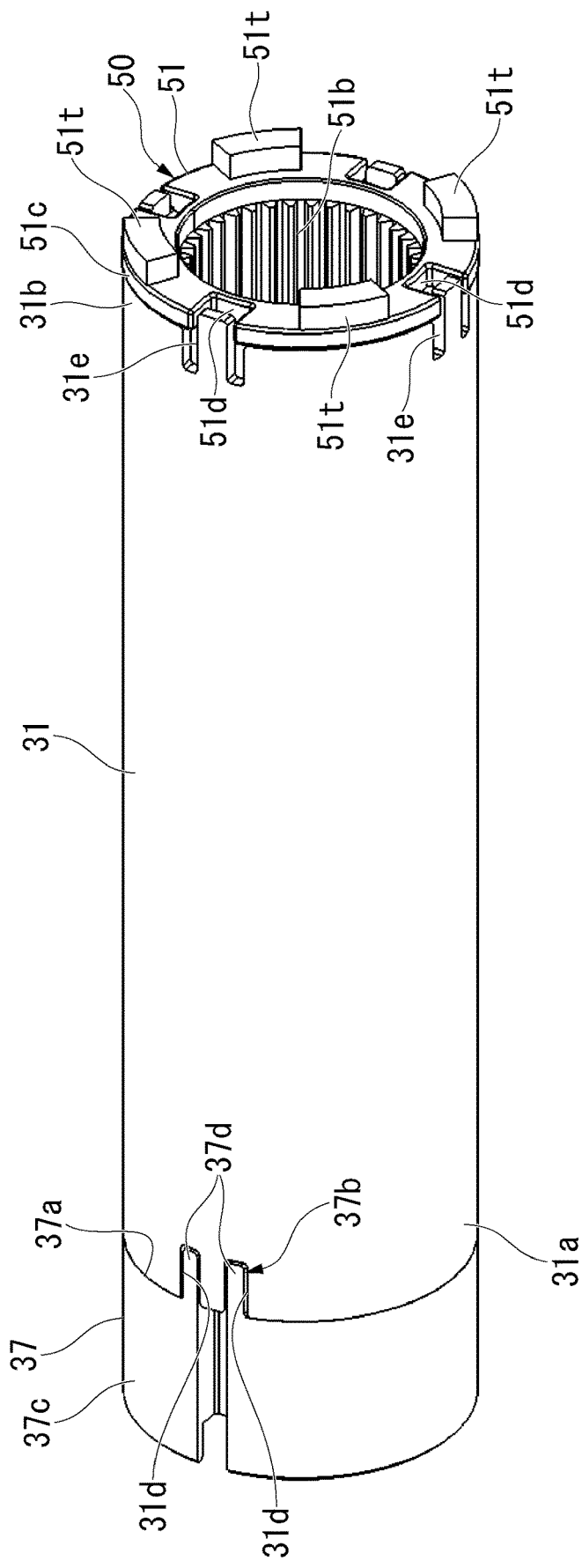
FIG. 5 is a perspective view illustrating a yoke and an internal gear in the embodiment of the present invention.

FIG. 5 is a perspective view illustrating a yoke 31 of the motor part 30 and an internal gear 51 of the speed reduction gear part 50.

As illustrated in FIGS. 4 and 5, the motor part 30 includes a yoke 31, magnets 32 that are fixed to an inner circumferential surface 31f of the yoke 31, an armature 130 that is rotatably provided on an inner side of the yoke 31 in a radial direction, a power supplying part 35 that supplies a current to the armature 130, and a detecting part 36 that detects a rotation position of the armature 130.

The yoke 31 is made of a metal, has a cylindrical shape, and is disposed in the first housing 10. An outer diameter of the yoke 31 is smaller than the inner diameter of the first housing 10 by a predetermined dimension. A holder member 37 is provided close to one end 31a of the yoke 31. The holder member 37 has a discoid plate part 37a that blocks the one end 31a of the yoke 31, a first tubular part 37b that is inserted into the yoke 31 from the plate part 37a, and a second tubular part 37c that is formed to extend from the plate part 37a toward a side opposite to the first tubular part 37b.

The plate part 37a and the second tubular part 37c have approximately the same outer diameter as the yoke 31. The holder member 37 is mounted by inserting the first tubular part 37b into the yoke 31 and abutting the plate part 37a on the one end 31a (a left end in FIG. 4) of the yoke 31.

As illustrated in FIG. 5, protrusions 37d extending in an axial direction of the yoke 31 are formed on an outer circumferential surface of the first tubular part 37b. Slits 31d with which the protrusions 37d are engaged are formed in the one end 31a of the yoke 31. The protrusions 37d and the slits 31d are engaged, and thereby the holder member 37 is provided to be immovable relative to the yoke 31 in a circumferential direction.

As illustrated in FIG. 4, the internal gear (a gear case or a ring gear) 51 constituting the speed reduction gear part 50 (to be described below) is inserted in the other end 31b side (a right end in FIG. 4) of the yoke 31. The internal gear 51 integrally includes a discoid plate part 51a, a cylindrical tubular part 51b that extends from an outer circumferential portion of the plate part 51a toward the other end 31b of the yoke 31, and a flange part 51c whose diameter increases from the tubular part 51b toward an outer circumference at an end of a side opposite to the plate part 51a.

This internal gear 51 is mounted by inserting the tubular part 51b into the yoke 31 with the plate part 51a directed toward the one end 31a side of the yoke 31, and abutting the flange part 51c on the other end 13b of the yoke 31.

As illustrated in FIG. 5, slits 51d are formed in the flange part 51c of the internal gear 51, and protrusions 31e formed to extend from the other end 13b of the yoke 31 in an axial direction are engaged with the slits 51d by swaging or the like. Since the slits 51d and the protrusions 31e are engaged, the internal gear 51 is provided to be immovable relative to the yoke 31 in a circumferential direction.

As illustrated in FIG. 4, an end damper 38 is provided between the second tubular part 37c of the holder member 37 and the plate part 11a of the joint member 11. The end damper 38 is formed of a rubber material having elasticity, and integrally has a discoid plate part 38a that is interposed between the second tubular part 37c of the holder member 37 and the plate part 11a of the joint member 11, and a tubular part 38b which extends from an outer circumferential portion of the plate part 38a toward the holder member 37 side and into the inside of which the second tubular part 37c is inserted. The plate part 11a of the joint member 11 and the plate part 38a of the end damper 38 are kept in contact with each other. A convex part is formed at any one of the plate parts 11a and 38a, and a concave part in which the convex part is fitted is formed at the other (neither of the convex and concave parts is shown). Thereby, the plate parts 11a and 38a do not relatively rotate.

Here, the tubular part 38b of the end damper 38 is interposed between the second tubular part 37c of the holder member 37 and the first housing 10 in the vicinity of the one end 31a of the yoke 31. Thereby, a clearance C1 is formed between the yoke 31 and the first housing 10.

The magnets 32 fixed to the inner circumferential surface 31f of the yoke 31 are long in a direction of the central axis of the yoke 31. The plurality of magnets 32 are provided in a circumferential direction of the inner circumferential surface 31f of the yoke 31 at intervals.

The armature 130 provided on the inner side of the yoke 31 in the radial direction has a shaft 33, a core 34a that is fixed to the shaft 33, and a coil 34b that is wound around the core 34a.

The shaft 33 is provided to extend in the direction of the central axis of the yoke 31. One end 33a of the shaft 33 is supported to freely rotate about the central axis thereof by an annular bearing 38A provided in the center of the plate part 37a of the holder member 37.

The other end 33b of the shaft 33 is supported to freely rotate about the central axis thereof by an annular bearing 38B provided in the center of the plate part 51a of the internal gear 51.

The core 34a is integrally provided on an outer circumferential surface of the shaft 33 between the two bearings 38A and 38B. The core 34a has a plurality of teeth 131 that extend radially. The coil 34b is wound around these teeth 131 via an insulator 132 having an insulating property.

The power supplying part 35 supplying a current to the armature 130 configured in this way is held by the holder member 37. The power supplying part 35 has a brush 35a that is held by the holder member 37, and a commutator 35b that is provided on the shaft 33 and is slidably in contact with the brush 35a. A wiring (not shown) supplying power from an external power supply is connected to the brush 35a. This wiring (not shown) passes through the plate part 37a of the holder member 37, the end damper 38, and the plate part 11a of the joint member 11 and is led out from the other end 10b (the left end in FIG. 4) of the actuator 100 to the outside. The commutator 35b is electrically connected to the coil 34b.

The detecting part 36 for detecting a rotation position of the armature 130 includes a sensor magnet 39 and a sensor board 40.

The sensor magnet 39 is integrally provided at the one end 33a (the left end in FIG. 4) of the shaft 33 in the vicinity of the second tubular part 37c with respect to the plate part 37a of the holder member 37.

The sensor board 40 has a plate shape, and is held in the second tubular part 37c of the holder member 37. When the sensor magnet 39 is rotated along with the shaft 33, a magnetic detector 40s such as a Hall IC which detects the rotation of the sensor magnet 39 is provided on this sensor board 40 at a side opposite to the sensor magnet 39. An output signal line (not shown) outputting a detected signal to the outside in the magnetic detector 40s is connected to the sensor board 40.

When this motor part 30 conducts a current to the coil 34b through the wiring (not shown) of the power supplying part 35 and the brush 35a, the shaft 33 is driven to rotate about the central axis thereof by a magnetic attractive or repulsive force occurring between a magnetic force that is generated by the coil 34b and a magnetic force that is generated by the magnets 32 which is fixed to the yoke 31.

The rotation of the sensor magnet 39 of the detecting part 36 provided integrally with the shaft 33 is detected by the magnetic detector 40s of the sensor board 40, and thereby the number of rotations of the shaft 33 is detected at the detecting part 36. The rotation of the sensor magnet 39 which is detected by the magnetic detector 40s, namely the rotation of the shaft 33, is output from the other end 10b of the actuator 100 to the outside via the output signal line (not shown).

(Speed Reduction Gear Part)

The speed reduction gear part 50 is provided at a side opposite to the power supplying part 35 of the motor part 30 configured in this way. The speed reduction gear part 50 includes the internal gear 51, a first sun gear 52, first-stage planetary gears 53, a first carrier 54, a second sun gear 55, second-stage planetary gears 56, and a second carrier 57.

The internal gear 51 provided in the other end 31b of the yoke 31 has gear teeth 51g formed on the inner circumferential surface of the tubular part 51b.

The first sun gear 52 is fitted into the other end 33b of the shaft 33, and gear teeth 52g are formed on an outer circumferential surface of the first sun gear 52.

For example, three first-stage planetary gears 53 are provided at an outer circumferential portion of the first sun gear 52. Gear teeth 53g meshed with the gear teeth 52g of the first sun gear 52 and the gear teeth 51g of the internal gear 51 are formed on an outer circumferential surface of each of the first-stage planetary gears 53.

The first carrier 54 has a disc shape and is disposed at a side of the plurality of first-stage planetary gears 53 which is opposite to the shaft 33. The first carrier 54 is formed in a disc shape, and a support shaft that rotatably supports the first-stage planetary gears 53 is assembled to the first carrier 54.

The second sun gear 55 is integrally provided in the center of the first carrier 54 at the side opposite to the shaft 33. The second sun gear 55 has gear teeth 55g formed on an outer circumferential surface thereof.

For example, three second-stage planetary gears 56 are provided at an outer circumferential portion of the second sun gear 55. Gear teeth 56g meshed with gear teeth 55g of the second sun gear 55 and the gear teeth 51g of the internal gear 51 are formed on an outer circumferential surface of each of the second-stage planetary gears 56.

The second carrier 57 is disposed at a side of the plurality of second-stage planetary gears 56 which is opposite to the shaft 33. The second carrier 57 is formed in a disc shape, and a support shaft (not shown) that rotatably supports the second-stage planetary gears 56 is assembled to the second carrier 57.

Here, a washer 58A is disposed between the plate part 51a of the internal gear 51 and the first-stage planetary gears 53, and a washer 58B is disposed between the first carrier 54 and the second-stage planetary gears 56.

The first sun gear 52 and the second sun gear 55 are each made of a metal such as a sintering material, and the first carrier 54 and the second carrier 57 are also made of a metal. The internal gear 51, the first-stage planetary gear 53, and the second-stage planetary gear 56 are each made of a resin.

Further, the gear teeth 51g of the internal gear 51, the gear teeth 52g of the first sun gear 52, the gear teeth 53g of the first-stage planetary gear 53, the gear teeth 55g of the second sun gear 55, and the gear teeth 56g of the second-stage planetary gear 56 are each formed as a helical gear. Thereby, a meshing allowance between the gears of the speed reduction gear part 50 can be increased to reduce an operating sound.

Portions at which the gear teeth 51g of the internal gear 51 are meshed with the gear teeth 53g of the first-stage planetary gear 53 and are meshed with the gear teeth 56g of the second-stage planetary gear 56 are formed by the gear teeth 51g having the same continuous pitch. Thereby, the internal gear 51 can be easily produced.

In this speed reduction gear part 50, when the shaft 33 is rotated, the first sun gear 52 is rotated integrally with the shaft 33. The rotation of the first sun gear 52 is transmitted to the first-stage planetary gears 53 on an outer circumference side of the first sun gear 52. Each of the first-stage planetary gears 53 revolves around the outer circumferential portion of the first sun gear 52 while being meshed with the gear teeth 52g of the first sun gear 52 and the gear teeth 51g of the internal gear 51 of an outer circumference side thereof, and simultaneously rotates about the support shaft assembled to the first carrier 54, which is called carrying out planetary motion.

Due to the planetary motion of the plurality of first-stage planetary gears 53, the first carrier 54 is decelerated and rotated about the same axis as the shaft 33.

When the first carrier 54 is rotated, the second sun gear 55 is integrally rotated, and the rotation thereof is transmitted to the second-stage planetary gears 56 of an outer circumference side thereof. Each of the second-stage planetary gears 56 revolves around the outer circumferential portion of the second sun gear 55 while being meshed with the gear teeth 55g of the second sun gear 55 and the gear teeth 51g of the internal gear 51 of an outer circumference side thereof, and simultaneously rotates about the support shaft assembled to the second carrier 57 which is called carrying out planetary motion.

Due to the planetary motion of the plurality of second-stage planetary gears 56, the second carrier 57 is decelerated and rotated about the same axis as the shaft 33.

One end 60a of the screw shaft 60 is held to freely rotate about the central axis of the screw shaft 60 by a bearing 61 provided in the first housing 10. The bearing 61 is held inside an annular bearing holder 62 that is fitted into and fixed in the first housing 10 by swaging or the like.

Figure 6:
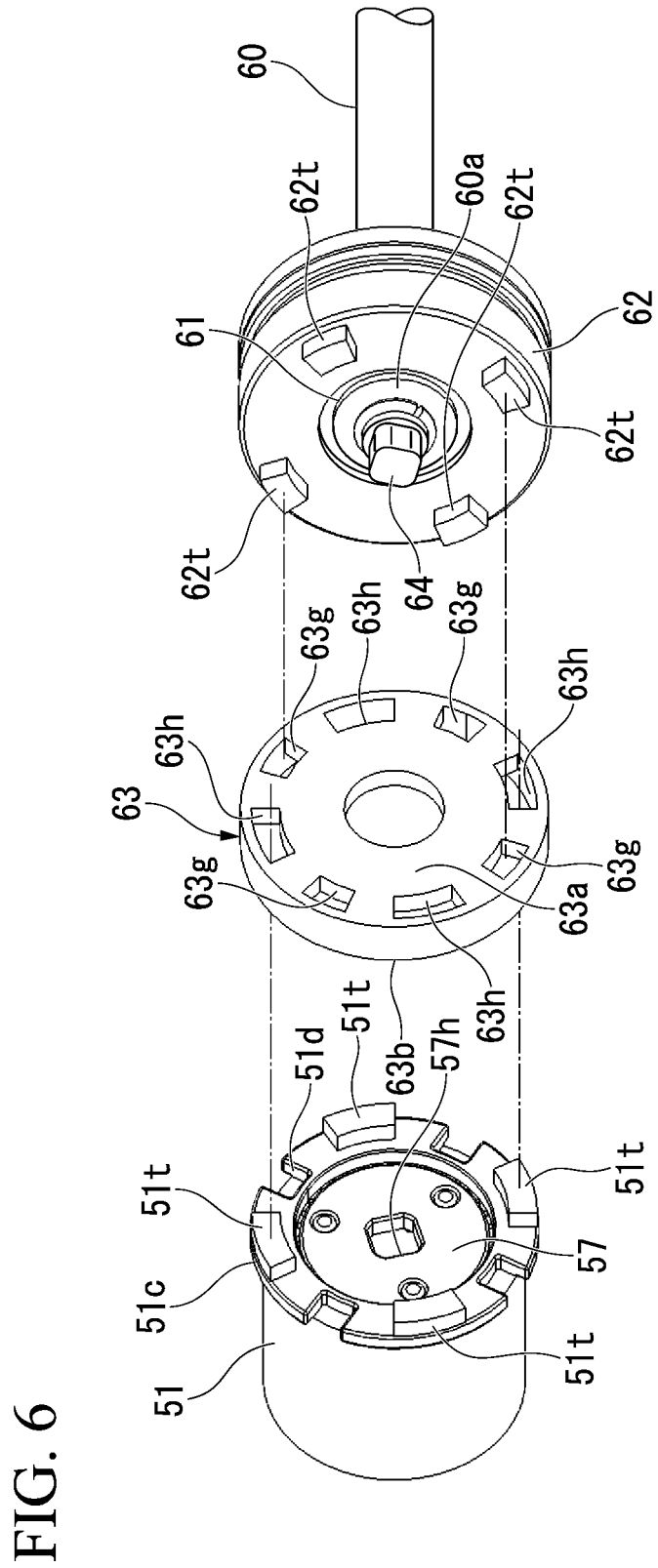
FIG. 6 is a perspective development view illustrating a damper member disposed between the internal gear and a bearing holder in the embodiment of the present invention.

FIG. 6 is a perspective development view illustrating a damper member 63 disposed between the internal gear 51 and the bearing holder 62.

As illustrated in FIGS. 4 and 6, the damper member 63 is provided between the bearing 61 and the bearing holder 62 and the flange part 51c of the internal gear 51.

The damper member 63 is formed of a rubber material having elasticity, and integrally has a discoid plate part 63a that is sandwiched between the bearing 61 and the bearing holder 62 and the flange part 51c of the internal gear 51, and a tubular part 63b which extends from an outer circumferential portion of the plate part 63a toward the internal gear 51 side and into which the flange part 51c of the internal gear 51 is inserted.

Here, the tubular part 63b of the damper member 63 is interposed between the other end 31b of the yoke 31 and the flange part 51c of the internal gear 51 and the first housing 10 in the vicinity of the other end 31b of the yoke 31, and a clearance C1 is formed between the yoke 31 and the first housing 10. That is, the motor part 30 and the speed reduction gear part 50 are supported floatingly on the first housing 10 by the end damper 38 and the damper member 63 that are provided at opposite ends of these parts in an axial direction.

In the bearing holder 62 fixed to the first housing 10 by swaging, a plurality of protrusions 62t are formed at a side opposite to the damper member 63 at intervals in a circumferential direction. In the flange part 51c of the internal gear 51, a plurality of protrusions 51t are formed at the side opposite to the damper member 63 at intervals in the circumferential direction. A plurality of insertion holes 63h and 63g into which the protrusions 51t and 62t are inserted respectively are formed in the damper member 63 at intervals in the circumferential direction. That is, the yoke 31 is prevented from rotating relative to the first housing 10 by the protrusions 51t formed on the internal gear 51 and the protrusions 62t formed on the bearing holder 62 fixed to the first housing 10. The protrusions 51t and the protrusions 62t are inserted into the insertion holes 63h and 63g of the damper member 63, and thereby vibration of the motor part 30 and vibration of the speed reduction gear part 50 are prevented from being transmitted to the first housing 10.

A gear 64 meshed with an output gear hole 57h formed in the center of the second carrier 57 of the speed reduction gear part 50 is provided at the one end 60a of the screw shaft 60. Thereby, the rotation of the shaft 33 in the motor part 30 is transmitted to the screw shaft 60 via the speed reduction gear part 50, and the screw shaft 60 is driven to rotate about the central axis thereof.

Figure 7:
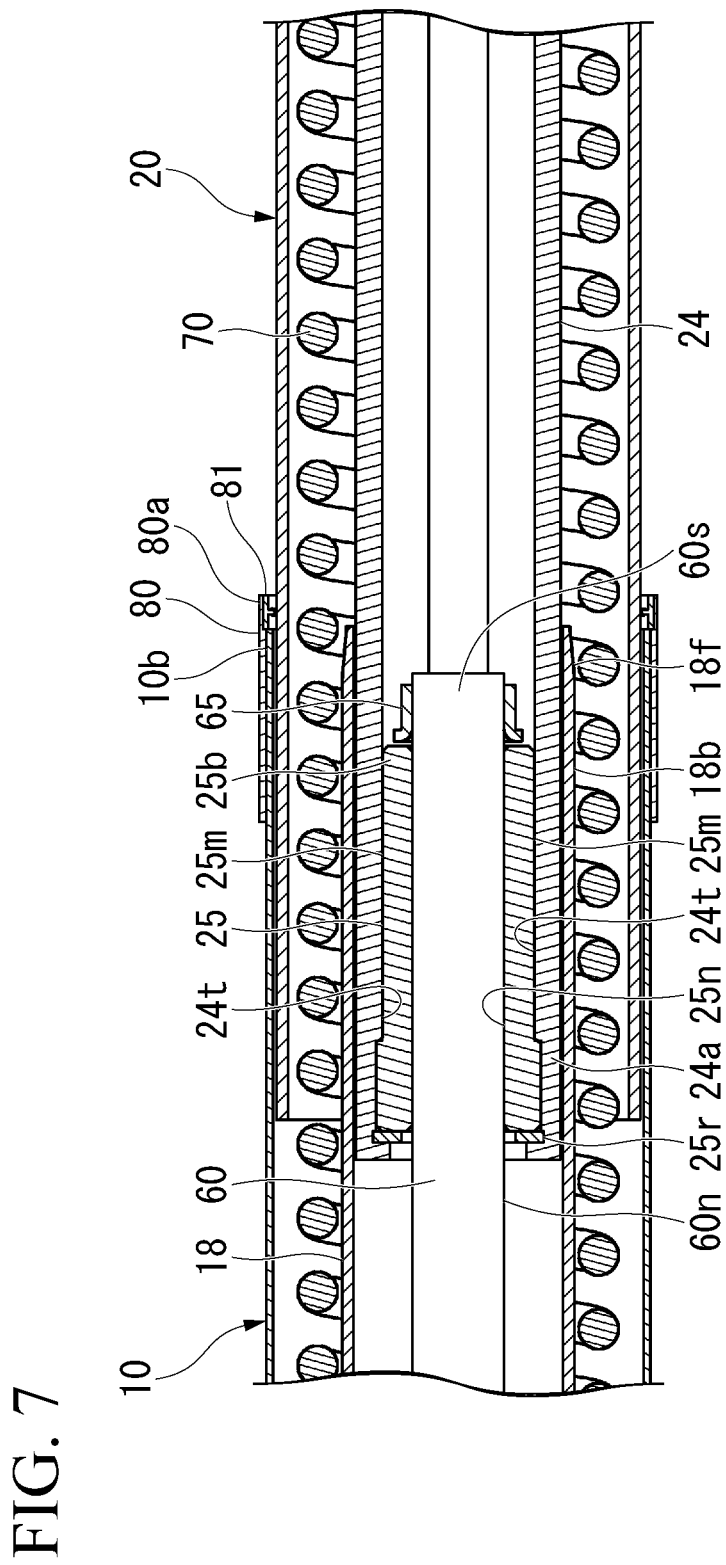
FIG. 7 is an enlarged sectional view illustrating a joint portion between a first housing and a second housing in the embodiment of the present invention.

FIG. 7 is an enlarged sectional view illustrating a joint portion between the first housing 10 and the second housing 20.

As illustrated in the same figure, a screw bar 60n that is continuous in a spiral shape is formed on an outer circumferential surface of the screw shaft 60. The other end 60b side of the screw shaft 60 is inserted into a nut member 25 provided inside one end 24a of the inner tube 24 of the second housing 20.

Figure 8:
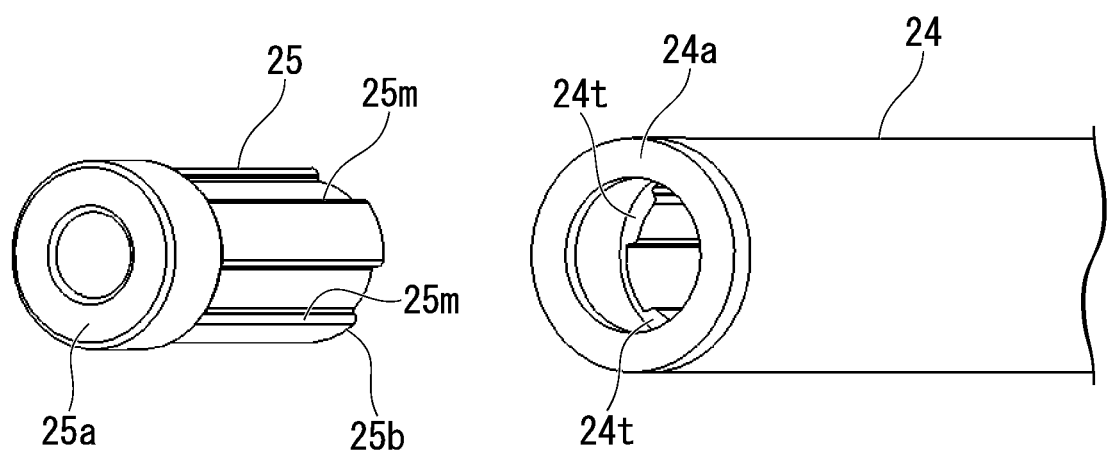
FIG. 8 is a perspective development view illustrating an inner tube and a nut member in the embodiment of the present invention.

FIG. 8 is a perspective development view illustrating the inner tube 24 and the nut member 25.

As illustrated in the same figure, the nut member 25 has a plurality of grooves 25m (e.g., four grooves in this embodiment) formed in an outer circumferential surface thereof at intervals in a circumferential direction. On the other hand, a plurality of protrusions 24t (e.g., four protrusions in this embodiment) that are continuous in an axial direction of the inner tube 24 are formed on an inner circumferential surface of the inner tube 24, into which the nut member 25 is inserted, at intervals in a circumferential direction.

The nut member 25 is disposed by meshing the grooves 25m with the protrusions 24t of the inner tube 24. Thereby, rotation of the nut member 25 in the circumferential direction on the inner tube 24 is restricted. Since the other end 24b of the inner tube 24 is screwed on the joint member 21 provided at the other end 20b of the second housing 20, relative rotation between the nut member 25 and the second housing 20 is restricted via the joint member 21 and the inner tube 24.

As illustrated in FIG. 7, the grooves 25m of the nut member 25 are formed from an end 25b of the nut member 25 which is opposite to the first housing 10 side toward the first housing 10 side over a predetermined length. Thereby, the grooves 25m are not formed within a range of a fixed length from an end 25a of the nut member 25 which is close to the first housing 10. The protrusions 24t formed at the inner tube 24 are also not formed within a range of a predetermined length from the one end 24a of the inner tube 24.

In this way, the grooves 25m are not formed over the entirety in an axial direction, and movement of the nut member 25 in a direction away from the first housing 10 is restricted by meshing between the grooves 25m of the nut member 25 and the protrusions 24t of the inner tube 24.

The end 25a of the nut member 25 is fixed in the inner tube 24 by a snap ring 25r or by swaging or the like.

The screw shaft 60 is configured such that the screw bar 60n thereof is screwed on a female screw groove 25n formed in an inner circumferential surface of the nut member 25 and a tip 60s thereof passes through and protrudes from the nut member 25.

A stopper 65 overhanging an outer circumference side is integrally fixed to the tip 60s of the screw shaft 60 by swaging or the like. The nut member 25 is prevented from coming out from the screw shaft 60 by this stopper 65.

As illustrated in FIG. 3, a coil spring 70 is disposed in the first housing 10 and the second housing 20. The coil spring 70 is made of, for instance, a metal. The inner tube 24 is inserted inside the coil spring 70 in the second housing 20. A tubular guide tube 18 provided in the first housing 10 is inserted inside the coil spring 70 in the first housing 10.

As illustrated in FIG. 7, the guide tube 18 has a larger inner diameter than an outer diameter of the inner tube 24. The inner tube 24 is inserted into and disposed in the guide tube 18. An outer circumferential surface 18f of the other end 18b side of the guide tube 18 is formed in a tapered shape in which an outer diameter thereof gradually reduces from one end 18a side toward the other end 18b side.

As illustrated in FIG. 4, a flange part 18c overhanging an outer circumference side is integrally formed close to the one end 18a of the guide tube 18. Further, an annular sealing member 66 is sandwiched between the flange part 18c of the guide tube 18 and the bearing holder 62. The sealing member 66 is formed of a material such as a rubber material having watertightness and elasticity, and an outer circumferential surface thereof is in close contact with the first housing 10.

The inner tube 24 and the guide tube 18 are inserted inside the coil spring 70, and thereby when the coil spring 70 is expanded/contracted, bending or buckling laterally in a direction of expansion/contraction of the coil spring 70 is inhibited.

This coil spring 70 is provided in a compressed state between the plate part 21a of the joint member 21 of the second housing 20 and the flange part 18c of the guide tube 18. Thereby, the first housing 10 and the second housing 20 are separated from each other, and the coil spring 70 is biased in a direction in which a full length of the actuator 100 is increased.

The flange part 18c of the guide tube 18 is compressed to the sealing member 66 side by the coil spring 70. In other words, the sealing member 66 is sandwiched by the flange part 18c of the guide tube 18 and the bearing holder 62.

As illustrated in FIG. 7, a cylindrical outer ring 80 is provided at an outer circumference side of the other end 10b of the first housing 10. The outer ring 80 is formed of a material such as a metal having high rigidity, and is press-fitted around and fixed to the other end 10b of the first housing 10.

A tip 80a of the outer ring 80 slightly protrudes from the other end 10b of the first housing 10 toward the second housing 20 side. An annular seal ring 81 formed of a rubber material having watertightness and elasticity in an annular shape is integrally provided on an inner circumferential surface of the tip 80a of the outer ring 80.

In this way, the outer ring 80 and the seal ring 81 that are of different materials may be formed by, for instance, two-color molding.

An inner circumferential surface of the seal ring 81 is in sliding contact with an outer circumferential surface of the second housing 20. Water or the like is prevented from penetrating into the actuator 100 from a gap between the first housing 10 and the second housing 20 by this seal ring 81.
(Operation of Actuator for Opening/Closing Vehicle Door)

Next, an operation of the actuator 100 will be described.

When the shaft 33 of the motor part 30 is driven to rotate, the rotation of the shaft 33 is transmitted to the screw shaft 60 via the speed reduction gear part 50. Thereby, when the screw shaft 60 is rotated, the nut member 25 moves in an axial direction of the screw shaft 60. Since the nut member 25 is fixed to the inner tube 24 integrated with the second housing 20, the second housing 20 is projected/retracted with respect to the first housing 10, and the actuator 100 is expanded/contracted.

At this time, the first housing 10 is formed of a metal material such as iron, whereas the second housing 20 is formed of a soft material such as a resin. For this reason, a slide mark does not occur on both of the first housing 10 and the second housing 20, and occurs only on the second housing 20. Furthermore, the second housing 20 is formed of a resin or the like. Thereby, the slide mark is inconspicuous, and design characteristics are maintained.

Figure 9:
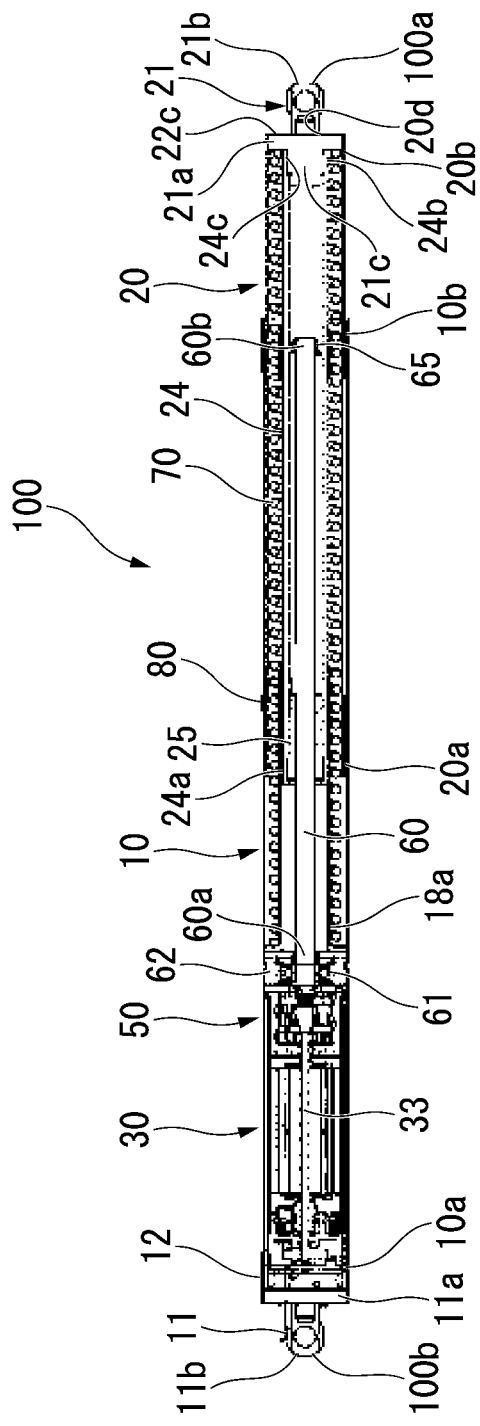
FIG. 9 is a sectional view illustrating a state in which the actuator for opening/closing a vehicle door is contracted in the embodiment of the present invention.

FIG. 9 is a sectional view illustrating a state in which the actuator 100 is contracted.

As illustrated in the same figure, when the second housing 20 is retracted with respect to the first housing 10, the back gate 2 provided for the opening 3 of the vehicle 1 is closed. On the other hand, as illustrated in FIG. 3, when the second housing 20 is projected with respect to the first housing 10, the back gate 2 provided for the opening 3 of the vehicle 1 is opened. At this time, although an operation of the motor part 30 is stopped with the actuator 100 expanded, a state in which the second housing 20 is projected with respect to the first housing 10 is maintained due to a biasing force of the coil spring 70.

Here, in the above embodiment, the internal gear 51 of the speed reduction gear part 50 is provided on the inner circumferential surface 31g of the yoke 31 of the motor part 30. For this reason, the relative position between the yoke 31 and the internal gear 51 can be determined with ease and with high accuracy.

Furthermore, the bearing 38B rotatably supporting the shaft 33 of the motor part 30 is provided at the internal gear 51. For this reason, the central axis of the motor part 30 and the central axis of the speed reduction gear part 50 can be aligned with ease and with high accuracy. Occurrence of a problem that excessive stress is applied to the components so that durability is damaged, a problem that a collision between the components becomes strong so that operating noise is increased, or the like can be prevented. Therefore, durability, operability, etc. of the actuator 100 is increased, and the vibration and the operating noise are reduced, so that a quality can be enhanced.

In addition, since the bearing 38B rotatably supporting the shaft 33 of the motor part 30 is provided at the internal gear 51, there is no need to apply a drawing process or the like on the yoke 31 in order to support the bearing 38B, and thus processing costs of the yoke 31 can be reduced.

Further, since the speed reduction gear part 50 is constituted of a planetary speed reduction mechanism, a space can be saved while increasing a reduction ratio of the speed reduction gear part 50.

The planetary speed reduction mechanism constituting the speed reduction gear part 50 has a multi-stage constitution, and the gear teeth 51g formed on the inner circumferential surface of the internal gear 51 are formed at the same pitch to be meshed with those of the first-stage planetary gears 53 and the second-stage planetary gears 56. Thereby, the internal gear 51 can be easily manufactured.

The internal gear 51 is fixed to the inner circumferential surface 31g of the yoke 31 by swaging. For this reason, the internal gear 51 can be reliably positioned and fixed with respect to the yoke 31. Further, when the motor part 30 is rotated, the internal gear 51 can be prevented from rotating due to a reaction force of the motor part 30.

The guide tube 18 is provided in the first housing 10, and the sealing member 66 is sandwiched by the flange part 18c of the guide tube 18 and the bearing holder 62. For this reason, the flange part 18c and the bearing holder 62 are in close contact with the sealing member 66, and a sealing characteristic between the flange part 18c and the bearing holder 62 is secured. As a result, for example, even when water and dust penetrate from the gap between the first housing 10 and the second housing 20, the water and the dust can be prevented from penetrating into the motor part 30 by the sealing member 66. Therefore, the durability of the actuator 100 can be improved, and reliability of the operation thereof can be increased.

Furthermore, the coil spring 70 is provided between the first housing 10 and the guide tube 18, and the flange part 18c is pressed against the sealing member 66 side using a spring force of the coil spring 70. For this reason, close contact of the flange part 18c and the bearing holder 62 with the sealing member 66 can be improved.

Buckling of the coil spring 70 in a direction intersecting a compression direction of the coil spring 70 during compression can be prevented by the guide tube 18. Since a pressing force of the coil spring 70 is transmitted to the sealing member 66 via the flange part 18c, the pressing force of the coil spring 70 uniformly acts on the sealing member 66. For this reason, close contact of the flange part 18c and the bearing holder 62 with the sealing member 66 can be improved.

Here, the sealing member 66 is provided to be in close contact with the bearing holder 62, and the guide tube 18 is used to increase watertightness and dust resistance of the motor part 30 side. However, since this guide tube 18 is provided, there is no need to provide a step surface at a position corresponding to the bearing holder 62 on the first housing 10 and to bring the bearing holder 62 and the sealing member 66 into close contact with each other. That is, there is no need to apply a deep drawing process on a place corresponding to the guide tube 18 on the first housing 10 according to a shape of this guide tube 18 and to form a step surface (an inner wall) abutting against the sealing member 66 on the first housing 10. For this reason, the first housing 10 can be formed in a tubular shape, and processing costs of the first housing 10 can be reduced.

Since the first housing 10 can be formed in a tubular shape, when the actuator 100 is assembled, after the motor part 30, the speed reduction gear part 50, and the bearing holder 62 are assembled to the first housing 10, the sealing member 66, the guide tube 18, and the coil spring 70 have only to be inserted from the other end 10b side of the first housing 10 in that order. For this reason, assemblability of the actuator 100 can also be improved.

Since the inner tube 24 is provided in the second housing 20, the inner tube 24 is disposed at the other end 18b side of the guide tube 18. For this reason, the full length of the coil spring 70 can be guided by the two tubes 18 and 24 of the guide tube 18 and the inner tube 24.

Buckling of the coil spring 70 in the direction intersecting the compression direction of the coil spring 70 during the compression can be prevented by the inner tube 24. The pressing force of the coil spring 70 more uniformly acts on the sealing member 66. As a result, close contact of the flange part 18c and the bearing holder 62 with the sealing member 66 can be further improved.

Further, since the inner tube 24 holds the nut member 25, there is no need to provide another component or the like in order to hold the nut member 25, and the number of components can be reduced.

Furthermore, the actuator 100 further includes the tubular outer ring 80 that is provided at the end of the first housing 10 and the annular seal ring 81 that is provided on the inner circumferential surface of the outer ring 80 and is in sliding contact with the outer circumferential surface of the second housing 20. Thereby, penetrating materials (rainwater, dust, etc.) can be prevented from penetrating from the gap between the first housing 10 and the second housing 20.

The end damper 38 is provided at the holder member 37 provided close to the one end 31a of the yoke 31, and the damper member 38 is provided at the internal gear 51 provided close to the other end 31b of the yoke 31. Thereby, the clearance C1 is formed between the yoke 31 and the first housing 10. That is, the motor part 30, the power supplying part 35, and the speed reduction gear part 50 are supported floatingly on the first housing 10 via the end damper 38 and the damper member 38. For this reason, transmission of vibration of the motor part 30 or the speed reduction gear part 50, and vibration between the motor part 30 or the speed reduction gear part 50 and the screw shaft 60 to the first housing 10 can be inhibited. For this reason, vibration and noise of the actuator 100 during operation can be reduced.

Further, the protrusions 51t protruding to the damper member 63 side are formed on the internal gear 51, the protrusions 62t protruding to the damper member 63 side are formed on the bearing holder 62, and the insertion holes 63h and 63g into which the protrusions 51t and the protrusions 62t can be inserted are formed in the damper member 63. For this reason, in the damper member 63, relative displacement between the internal gear 51 side and the bearing holder 62 side in a circumferential direction can be absorbed. Thereby, occurrence of vibration and shocks in a rotating direction during the operation of the motor part 30 can be prevented. Vibration and shocks when the screw shaft 60 is rotated by an external force can be prevented from being input to the motor part 30 and the speed reduction gear part 50 side.

(Other Embodiments)

The present invention is not limited to the above embodiment, and is also variously modified for the above embodiment without departing from the scope of the present invention.

For example, a constitution of each part of the actuator 100 may be appropriately modified without departing the gist of the present invention. As an example, in the above embodiment, the case in which the speed reduction gear part 50 is constituted of the planetary speed reduction mechanism has been described. However, without being limited thereto, various speed reduction mechanisms may be applied in place of the planetary speed reduction mechanism. In this case, the gear case of the speed reduction mechanism may be disposed on the inner circumferential surface of the yoke 31 of the motor part 30, and the bearing 38B for rotatably supporting the shaft 33 may be provided in the gear case.

In the above embodiment, the case in which the four grooves 25m are formed in the outer circumferential surface of the nut member 25, the four protrusions 24t are formed on the inner circumferential surface of the inner tube 24, and thereby the rotation of the nut member 25 for the inner tube 24 in the circumferential direction is restricted has been described. However, without being limited thereto, at least one groove 25m may be formed in the outer circumferential surface of the nut member 25, and at least one protrusion 24t corresponding to the one groove 25m may be formed on the inner circumferential surface of the inner tube 24. Further, protrusions may be formed on the outer circumferential surface of the nut member 25, whereas grooves that can be engaged with the protrusions may be formed on the inner circumferential surface of the inner tube 24.

In the above embodiment, the case in which the tubular guide tube 18 is inserted into the tubular first housing 10 and the sealing member 66 is sandwiched by the flange part 18c of the guide tube 18 and the bearing holder 62 has been described. However, without being limited thereto, a place corresponding to the guide tube 18 of the first housing 10 may be configured to be formed to correspond to the shape of the guide tube 18 by a deep drawing process or the like, and the sealing member 66 may be configured to be sandwiched by the step surface formed thereby and the bearing holder 62. In this case, the coil spring 70 is disposed on an outer circumferential surface of the place of the first housing 10 which is subjected to the deep drawing process or the like.

In the above embodiment, the case in which the end damper 38 is provided at the holder member 37 provided close to the one end 31a of the yoke 31 and the damper member 38 is provided at the internal gear 51 provided close to the other end 31b of the yoke 31 has been described. The case in which the motor part 30, the power supplying part 35, and the speed reduction gear part 50 are floatingly supported on the first housing 10 via the end damper 38 and the damper member 38 has been described. However, without being limited thereto, the end damper 38 or the damper member 38 may be configured to be at least interposed between the first housing 10 and the yoke 31 in the vicinity of the opposite ends of the motor part 30. With this constitution, the vibration at least during the operation of the motor part 30 can be inhibited from being transmitted to the first housing 10.

Further, use of the actuator 100 is not limited to use of the opening/closing of the back gate 2, and the actuator 100 can be used for opening/closing of other various doors.

In addition to the foregoing, the constitution given in the above embodiment may be adopted or rejected as long as it does not depart from the scope of the present invention or may be modified to another constitution.

INDUSTRIAL APPLICABILITY

According to the actuator and the actuator for opening/closing a vehicle door, the gear case of the speed reduction gear part is provided on the inner circumferential surface of the yoke of the motor. Thereby, the relative position between the yoke and the gear case can be determined with ease and with high accuracy. Furthermore, since the bearing for rotatably supporting the rotary shaft is provided in the gear case, the central axis (the rotational axis) of the motor and the central axis of the speed reduction gear part can be aligned with ease and with high accuracy.

The bearing is provided in the gear case, and thereby there is no need to apply a drawing process or the like for supporting the bearing on the yoke. Thus, the processing costs of the yoke can be reduced.

Therefore, the assemblability of the actuator can be improved, and the workability of each component can be improved to reduce production costs.

DESCRIPTION OF THE REFERENCE SYMBOLS

1 Vehicle
2 Tailgate (door)
3 Opening
A Actuator
10 First housing
18 Guide tube
18c Flange part
20 Second housing
24 Inner tube
25 Nut member (driven member)
30 Motor part
31 Yoke
31e Protrusion (locking part)
31f Inner circumferential surface
33 Shaft (rotary shaft)
38 End damper
38A, 38B Bearing
50 Speed reduction gear part
51 Internal gear (gear case, ring gear)
51d Slit (locking part)
51g Gear tooth
51t Protrusion
52 First sun gear (sun gear)
53 First-stage planetary gear (planetary gear)
54 First carrier (rotary member)
55 Second sun gear (sun gear)
56 Second-stage planetary gear (planetary gear)
57 Second carrier (rotary member)
60 Screw shaft (drive shaft)
61 Bearing
62 Bearing holder
62t Protrusion
63 Damper member
63g, 63h Insertion hole
66 Sealing member
70 Coil spring
80 Outer ring
81 Seal ring
130 Armature

The invention claimed is:

1. An actuator comprising
a tubular yoke having an inner circumferential surface;
an armature including a rotary shaft, wherein the rotary shaft is provided inside the yoke, and wherein the rotary shaft is rotatable with respect to the yoke;
a drive shaft configured to be driven to rotate when receiving a rotating force from the rotary shaft;
a cylindrical first housing configured to house the drive shaft and the yoke;
a cylindrical second housing having first and second ends and having an outer diameter smaller than an inner diameter of the first housing and supported by the first housing to be movable into and out of one end of the first housing;
a speed reduction mechanism provided between the rotary shaft and the drive shaft and configured to into an output rotation speed of the speed reduction mechanism, wherein the output rotation speed is less than the input rotation speed rotation speed of the rotary shaft; and
a driven member connected to the drive shaft and configured to move in an axial direction of the drive shaft in response to the rotation of the drive shaft,
wherein a gear case of the speed reduction mechanism is provided on the inner circumferential surface of the yoke, and a bearing for rotatably supporting the rotary shaft is provided in the gear case, and
a bottom is formed at the second end of the second housing, and a coil spring is disposed in the first and second housings, and
further comprising a holder member that includes a power supplying part which supplies a current to the armature,
wherein part of the gear case of the speed reduction mechanism is fitted onto the inner circumferential surface of the yoke at a first end of the yoke proximal to the speed reduction mechanism,
at least part of the holder member is fitted onto the inner circumferential surface of the yoke at a second end of the yoke distal from the speed reduction mechanism,
the bearing that rotatably supports the rotary shaft is provided at a first side of the gear case adjacent the rotary shaft, a damper member having elasticity is provided between the first housing and a second side of the gear case adjacent the drive shaft, and an end damper having elasticity is provided between the holder member and the first housing.

2. The actuator according to claim 1, wherein:

the speed reduction mechanism comprises:
- a sun gear provided on the rotary shaft;
- a ring gear;
- a planetary gear meshed with the sun gear and the ring gear and configured to carry out planetary motion between the sun gear and the ring gear in accordance with a rotation of the sun gear; and
- a rotary member configured to be rotated by the motion of the planetary gear; and the gear case includes the ring gear.

3. The actuator according to claim 2, wherein the ring gear is fixed to the yoke.

4. The actuator according to claim 2, wherein:

the sun gear comprises a first sun gear and a second sun gear, the planetary gear comprises a first planetary gear and a second planetary gear, and the rotary member includes a first rotary member and a second rotary member, and the first sun gear, the first planetary gear, and the first rotary member are axially spaced from the second sun gear, the second planetary gear, and the second rotary member in an axial direction of the rotary shaft; and the ring gear has a tubular shape and has a first gear teeth part which is meshed with gear teeth of the first planetary gear and a second gear teeth part which is meshed with gear teeth of the second planetary gear.

5. The actuator according to claim 2, further comprising:

a bearing holder fitted to an inner circumferential surface of the first housing; and a drive shaft-side bearing is provided on the bearing holder and rotatably supports the drive shaft, wherein part of the damper member is sandwiched between the gear case and the bearing holder.

6. The actuator according to claim 1, wherein the yoke includes a locking part locking the yoke and the gear case together.

7. The actuator according to claim 1, further comprising:

a bearing holder fitted to an inner circumferential surface of the first housing; and a drive shaft-side bearing is provided on the bearing holder and rotatably supports the drive shaft, wherein part of the damper member is sandwiched between the gear case and the bearing holder.

8. An arrangement for opening and closing a vehicle door with respect to an opening, comprising the actuator according to claim 1, and wherein the yoke is coupled to one of the opening and the door via the first housing, and the driven member is coupled to the other of the opening and the door via the second housing.

* * * * *